United States Patent [19]

Rasshofer et al.

[11] Patent Number: 4,587,322
[45] Date of Patent: May 6, 1986

[54] PROCESS FOR THE PRODUCTION OF URETHANE-MODIFIED POLYISOCYANATE COMPOSITIONS USING A HYDANTOIN HAVING TWO HYDROXYL ALKYL SUBSTITUENTS

[75] Inventors: Werner Rasshofer, Cologne; Reiner Paul, Muelheim am Rhein, both of Fed. Rep. of Germany

[73] Assignee: Bayer Aktiengesellschaft, Leverkusen, Fed. Rep. of Germany

[21] Appl. No.: 698,005

[22] Filed: Feb. 4, 1985

[30] Foreign Application Priority Data

Feb. 18, 1984 [DE] Fed. Rep. of Germany ........ 3405939

[51] Int. Cl.$^4$ ............................................. C08G 18/38
[52] U.S. Cl. ........................................ 528/60; 528/61; 528/65; 528/66; 528/73
[58] Field of Search ................... 528/60, 61, 65, 66, 528/73

[56] References Cited

U.S. PATENT DOCUMENTS

| | | | |
|---|---|---|---|
| 2,850,474 | 9/1958 | Marey | 528/83 |
| 2,995,530 | 8/1961 | Frisch et al. | 528/85 |
| 3,365,426 | 1/1968 | Walles | 528/53 |
| 3,635,845 | 1/1972 | Porret et al. | 528/117 |
| 3,644,457 | 2/1972 | Konig et al. | 260/453 |
| 3,681,282 | 8/1972 | Preston | 528/28 |
| 3,839,354 | 5/1975 | Habermeier et al. | 260/309.5 |
| 3,883,571 | 5/1975 | Allport | 260/453 |
| 3,928,289 | 12/1975 | Reilly et al. | 528/45 |
| 4,002,798 | 1/1977 | Morgan | 428/419 |
| 4,017,650 | 4/1977 | Morgan | 427/53 |
| 4,031,026 | 6/1977 | Hobertson | 252/182 |
| 4,055,548 | 10/1977 | Carleton et al. | 260/77.5 |
| 4,115,429 | 9/1978 | Roliff | 260/453 |
| 4,118,411 | 10/1978 | Roliff et al. | 260/453 |
| 4,125,545 | 11/1978 | Kreplinski | 260/404 |
| 4,229,347 | 10/1980 | Holt | 260/239 |
| 4,234,714 | 11/1980 | Earing et al. | 528/67 |
| 4,261,852 | 4/1981 | Carroll et al. | 528/59 |
| 4,321,333 | 3/1982 | Alberimo et al. | 521/159 |

FOREIGN PATENT DOCUMENTS

| | | |
|---|---|---|
| 1129599 | 8/1982 | Canada . |
| 1178603 | 11/1984 | Canada . |
| 2523615 | 12/1975 | Fed. Rep. of Germany . |
| 2750722 | 5/1979 | Fed. Rep. of Germany . |
| 1369334 | 10/1974 | United Kingdom . |
| 1450660 | 9/1975 | United Kingdom . |
| 1430455 | 3/1976 | United Kingdom . |
| 1444192 | 7/1976 | United Kingdom . |
| 1577767 | 10/1980 | United Kingdom . |

*Primary Examiner*—Maurice J. Welsh
*Attorney, Agent, or Firm*—Gene Harsh; Joseph C. Gil; Lyndanne M. Whalen.

[57] ABSTRACT

Urethane-modified polyisocyanate compositions are made by reacting (a) an organic polyisocyanate or mixture of polyisocyanates having an NCO-content of from 5 to 45 wt % with (b) a hydantoin having an OH number of from 56 to 596 and containing two alcoholic hydroxyl groups. These reactants are used in quantities such that the NCO:OH equivalent ratio is from 2:1 to 50:1. The preferred polyisocyanates are 4,4′-diisocyanatodiphenylmethane and isomer mixtures thereof. The most preferred hydantoin is 5,5-dimethyl hydantoin. These urethane-modified polyisocyanates are particularly useful in the production of polyisocyanate addition products such as polyurethanes and polyisocyanurates.

8 Claims, No Drawings

PROCESS FOR THE PRODUCTION OF URETHANE-MODIFIED POLYISOCYANATE COMPOSITIONS USING A HYDANTOIN HAVING TWO HYDROXYL ALKYL SUBSTITUENTS

BACKGROUND OF THE INVENTION

This invention relates to a process for the production of new, urethane-modified polyisocyanate compositions.

The production of urethane-modified polyisocyanates (i.e. isocyanate-terminated prepolymers or semiprepolymers) particularly those based on polyisocyanates or polyisocyanate mixtures of the diphenylmethane series (4,4'-diisocyanatodiphenylmethane, mixtures thereof with 2,4'- and, optionally, 2,2'-diisocyanatodiphenylmethane or phosgenation products of aniline/formaldehyde condensates which, in addition to these diisocyanates, contain higher homologs thereof), and a variety of different polyhydroxyl compounds is known. Such polyisocyanates are described, for example, in European Patent Application Nos. 10,850 and 66,130; German Offenlegungsschriften Nos. 2,347,207, 2,404,166, 2,513,793, 2,513,796, 2,620,222, 2,622,104, 2,732,182, 2,737,338, 2,804,375, 2,810,596, 2,815,579 and 2,913,126; U.S. Pat. Nos. 3,644,457, 4,055,548, 4,234,714 and 4,321,333 and also British Pat. No. 1,369,334.

In general, the processes described in these prior publications are concerned with the liquefaction of diisocyanatodiphenylmethane, more particularly 4,4'-diisocyanatodiphenylmethane, which is solid at room temperature or with a reduction in the tendency towards crystallization during storage at low temperatures of polyisocyanate mixtures of the diphenylmethane series which are liquid at room temperature.

The use of hydantoin derivatives in polyisocyanate chemistry is also known. U.S. Pat. No. 3,928,289 describes the use of hydantoin containing hydroxyalkyl groups together with polyester and polyether polyols having a molecular weight of >700 for the production of polyurethanes. Aliphatic isocyanates are preferred. German Offenlegungsschrift No. 2,150,152 describes polyisocyanates obtained by reacting monohydroxyalkyl hydantoins and uracils with polyisocyanates, preferably in a stoichiometric ratio of 1:2. German Offenlegungsschrift No. 2,523,615 mentions the use of bishydroxyalkylated hydantoins, together with other crosslinkers and polyoxyalkylene polyols, combined with polyisotyanates as binders for foundry sand. U.S. Pat. No. 4,002,798 teaches that isocyanate-free compositions are obtained by reacting bis-hydroxyethyl hydantoin with an allyl alcohol and a diisocyanate and reacting the resulting polyene with a polythiol. Similar compositions are described in U.S. Pat. No. 4,017,650. According to German Offenlegungsschrift No. 2,750,722, hydantoins containing isocyanate groups may be obtained by subjecting the reaction product of an aminoalcohol and an unsaturated dicarboxylic acid ester to cyclization with a di- or polyisocyanate. The products are used for wire and electrical insulation lacquers.

However, it is not apparent from any of the prior publications mentioned above that isocyanate-group-containing prepolymers or semiprepolymers based on organic polyisocyanates and hydantoin derivatives containing alcoholic hydroxyl groups of the type used in the process of the present invention are compositions having a reduced melting point and a reduced tendency towards crystallization on storage at low temperatures and may be used with particular advantage in the production of polyurethane plastics, particularly polyurethane moldings having a homogeneous surface.

SUMMARY OF THE INVENTION

It has now surprisingly been found that urethane-modified polyisocyanate compositions based on organic polyisocyanates, particularly aromatic polyisocyanates, and more preferably on polyisocyanates or polyisocyanate mixtures of the diphenylmethane series and alkoxylation products of bisphenols of the type mentioned hereinafter are compositions having a reduced melting point and a reduced tendency towards crystallization during storage at low temperatures. These urethane-modified polyisocyanates are especially useful in the production of polyurethane plastics, particularly polyurethane moldings, having a homogeneous surface which are distinguished by considerably improved mechanical properties such as better thermal stability, greater rigidity and better green strength coupled with high flexibility, high breaking elongation and high thermal stability.

DETAILED DESCRIPTION OF THE INVENTION

The present invention relates to a process for the production of urethane-modified polyisocyanate compositions having an NCO-content of from 5 to 45 wt % by reacting an organic polyisocyanate having an NCO-content of from 30 to 50 wt % or a mixture of organic polyisocyanates having an NCO-content of from 30 to 50 wt % with an organic polyhydroxyl compound in quantities such that the NCO:OH-equivalent ratio is from 2:1 to 50:1. The organic polyhydroxyl compound must be made up of at least 50 hydroxyl equivalent percent of hydantoins containing 2 alcoholic hydroxyl groups which carry hydroxy alkyl substituents optionally containing ether bridges on the nitrogen and which have an OH-number in the range from 56 to 596. The hydantoin may optionally be used in admixture with up to 50 hydroxyl equivalent percent of other organic polyhydroxyl compounds.

The present invention also relates to the use of the urethane-modified polyisocyanate compositions obtained by this process as starting materials in the production of polyurethane plastics by the isocyanate polyaddition process or in the production of polyisocyanurate plastics.

Organic polyisocyanates having an NCO-content of from 30 to 50 wt % or mixtures of organic polyisocyanate such as these having an NCO-content of from 30 to 50 wt % may be used as starting materials in the process of the present invention.

Polyisocyanates containing aromatically bound isocyanate groups are preferably used in the process of the present invention. Examples of such polyisocyanates are: 2,4-diisocyanatotoluene, 2,6-diisocyanatotoluene, 1,2-bis-(4-isocyanatophenyl)-ethane, alkyl-substituted and, more particularly, methyl-substituted diisocyanatodiphenyl methanes (described, for example, in European Patent Application Nos. 24,665 and 46,556) and, more particularly, polyisocyanates or polyisocyanate mixtures of the diphenylmethane series. Mixtures of such polyisocyanates may also be used in the process according to the invention. The particularly preferred polyisocyanate mixtures of the diphenylmethane series are mixtures of 4,4'-diisocyanatodiphenylmethane, with 2,4'- and, optionally, 2,2'-diisocyanatodiphenylmethane in which the 2,4'-diisocyanatodiphenylmethane content, based on the mixture as a whole, is up to 70 wt % (preferably up to 20 wt %) and the 2,2'-diisocyanatodiphenyl methane content does not exceed 5 wt %. Polyisocyanates of the type obtained by phosgenating aniline/formaldehyde condensates and which, in addition to the abovedescribed diisocyanatodiphenylmethane isomers, may contain different quantities of higher homologous polyisocyanates (generally 5 to 60 wt %, based on the mixture as a whole) are also particularly preferred. Diphenylmethane polyisocyanates or polyisocyanate mixtures such as these, optionally in admixture with up to 50 NCO-equivalent percent (based on the mixture as a whole) of other aromatic polyisocyanates, are also preferred as polyisocyanates in the process according to the invention. However, it is most preferred to use the abovementioned polyisocyanates or polyisocyanate mixtures of the diphenylmethane series as the sole polyisocyanate component in the process of the present invention. The preferred polyisocyanates or polyisocyanate mixtures of the diphenylmethane series generally have an NCO-content of from about 31 to 34 wt %.

Reactants for the polyisocyanates are hydantoins containing 2 alcoholic hydroxyl groups which carry hydroxyalkyl substituents optionally containing ether bridges on the nitrogen and which have an OH-number in the range from 56 to 596. Typical examples of such polyhydroxyl compounds are those compounds corresponding to the formula

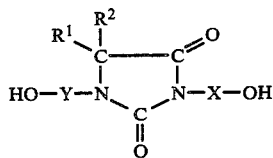

(I)

in which
$R^1$ and $R^2$ which may be the same or different, each represents an alkyl radical or, together with the carbon atoms of the heterocyclic ring, form a cycloaliphatic ring,
X represents a straight-chain or branched-chain alkylene radical containing from 2 to 6 C-atoms or a radical of the type obtained by removing the terminal oxygen atom from a polyalkylene ether chain, and
Y represents a radical within the definition of X or a radical corresponding to the formula

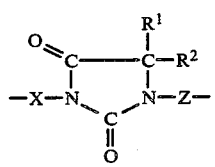

(II)

in which X, $R^1$ and $R^2$ are as defined above, the hydroxyl group is attached to the radical X, and Z represents a difunctional hydrocarbon radical.

Particularly preferred hydantoin compounds are those corresponding to the above-given formula (I) in which
$R^1$ and $R^2$ which may be the same or different, each represents an alkyl radical containing from 1 to 4 C-atoms or, together with the carbon atom of the heterocyclic ring, form a cyclopentane or cyclohexane ring, and
X and Y which may be the same or different, each represents an ethylene radical or a 1,2-propylene radical. Hydantoins in which $R^1$ and $R^2$ each represents a methyl group are most preferred.

The hydantoin derivatives corresponding to formula (I) may be obtained in known manner. For example, German Offenlegungsschrift No. 1,812,003 discloses that hydantoins may be made by alkoxylating the parent hydantoins which correspond to the formula

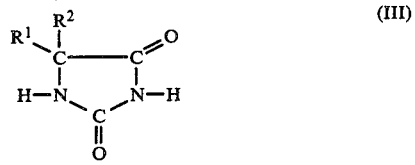

(III)

in which $R^1$ and $R^2$ are as defined above. Ethylene oxide and/or propylene oxide is/are preferably used as alkoxylating agent in this alkoxylation reaction. It is preferred that such alkoxylation be carried out in the presence of a suitable catalyst, such as tetraethyl ammonium chloride, tertiary amines (e.g., N,N-dimethyl benzyl amine) or aqueous sodium hydroxide solution at temperatures in the range from 20° to 200° C. (preferably from 60° to 150° C.). Where the alkylene oxides are used in a molar ratio of hydantoin to alkylene oxide of 1:2 or higher on the alkylene oxide side, the dihydroxy compounds containing a hydroxyalkyl substituent on both nitrogen atoms of the hydantoin ring are formed. Where a larger excess of alkylene oxide is used, alkoxylation products having N-substituents which are hydroxyalkyl radicals with incorporated ether bridges are formed. Where the alkylene oxides are used in quantities below the above-mentioned molar ratio of 1:2 (for example in accordance with German Auslegeschrift No. 1,912,026), monoalkoxylation products are formed which correspond to the formula

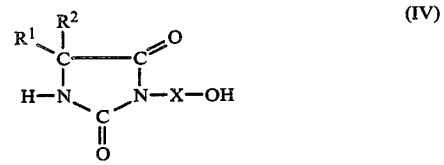

(IV)

(X=an alkylene radical).
These monoalkoxylation products may be reacted with dihalogen compounds corresponding to the formula Hal—Z—Hal     (V)

in which
Z is as previously defined and preferably represents an alkylene radical containing from 1 to 6 C-atoms, more especially a methylene radical, and
Hal represents chlorine or bromine, preferably chlorine, to form compounds containing two hydantoin rings of the type mentioned above.

According to U.S. Pat. Nos. 3,542,803 and 3,296,208, hydantoin compounds corresponding to general formula (III) may be reacted with dihalogen compounds corresponding to general formula (V) and the corresponding bis-hydantoin diols subsequently obtained by reaction with alkylene oxides. According to U.S. Pat. Nos. 2,417,999 and 2,418,000, bis-hydantoin compounds containing methylene bridges may be obtained by reacting a hydantoin with formaldehyde and alkoxylating the reaction product. It is also possible, on completion of the above-mentioned condensation reaction of the compounds corresponding to general formula (IV) with the compounds corresponding to general formula (V), which is preferably carried out at 20° to 250° C. (especially at 100° to 200° C.), preferably using a molar ratio of reactants (IV) to (V) of 1:2, optionally to subject the hydroxyalkyl substituent HO—X— to further alkoxylation to synthesize polyether glycols. Polyether diols such as these are also suitable for use as a starting material in the process of the present invention.

Suitable hydantoin starting compounds corresponding to formula (III) are, for example, hydantoin, 5-methyl hydantoin, 5,5-dimethyl hydantoin, 5-methyl-5-ethyl hydantoin, 5-n-propyl hydantoin, 5-isopropyl hydantoin, 1,3-diaza-spiro-(4,5)-decane-2,4-dione, 1,3-diaza-spiro-(4,4)-nonane-2,4-dione. It is preferred to use 5,5-dimethyl hydantoin.

The production of hydantoin compounds such as these is described, for example, in Houben-Weyl-Muller, Methoden der Org. Chemie, Vol. XI/2, pages 362–372, Thieme-Verlag, Stuttgart, 1958; in the Articles by E. S. Schipper and A. R. Day in R. C. Elderfield, Heterocyclic Compounds, Vol. V, pages 254–262, John Wiley & Sons, New York and Chapman & Hall, London, 1957 and by J. Habermeier in Angew. Makromol. Chem. 63, 63 (1977).

In the practical application of the process of the present invention, other polyhydroxyl compounds may be used in a quantity of up to 50 hydroxyl equivalent percent, based on all the polyhydroxyl compounds, in addition to the above-mentioned hydantoins containing hydroxyl groups (particularly those corresponding to general formula (I)). That is, the starting polyhydroxyl compounds, particularly the compounds corresponding to general formula (I), may be used in admixture with other polyhydroxyl compounds such as those described in the prior publications mentioned above which have already been used for modifying polyisocyanates of the diphenylmethane series or any other polyhydroxyl compounds known to those skilled in polyurethane chemistry (see for example U.S. Pat. No. 4,065,410). It is also possible in principle to react the starting polyisocyanates successively with the hydantoin compounds essential to the invention (particularly the compounds corresponding to general formula (I)) and then with the other polyhydroxyl compounds mentioned above or in reverse order with respect to the polyhydroxyl compounds. However, the process of the present invention is preferably carried out using only the hydantoin compounds essential to the invention, particularly the compounds corresponding to general formula (I).

In the practical application of the process of the present invention, the reactants are used in quantities corresponding to an equivalent ratio of isocyanate groups to hydroxyl groups of the hydantoin compounds (particularly to compounds corresponding to formula (I)) and any polyhydroxyl compounds additionally used, of from 2:1 to 50:1 and preferably from 4:1 to 20:1.

The process of the invention is generally carried out at a temperature in the range from 20° to 140° C. and preferably at a temperature in the range from 40° to 120° C. The reaction is generally carried out by combining the reactants at room temperature and then heating them to at most 140° C. and preferably to between 40° and 100° C. until the calculated NCO-content has been reached. It is also possible and, in some cases (e.g., when the hydroxyl component has a relatively high melting point and poor solubility in the polyisocyanate), even preferred to introduce the starting polyisocyanate or polyisocyanate mixture to the reaction vessel where it is heated to a temperature of, for example, from 40° C. to 140° C. (preferably from 80° C. to 120° C.) and then to add the polyhydroxyl component all at once or preferably in portions. It is important to ensure that the temperature prevailing inside the reaction vessel does not exceed the above-mentioned upper limit of approximately 140° C. so that secondary reactions (such as trimerization of the isocyanate groups) are avoided. The resulting polyisocyanate preparations containing urethane groups are generally so-called semi-prepolymers, i.e. mixtures of unreacted starting polyisocyanate with urethane-modified NCO-prepolymers. It is only where low NCO:OH equivalent ratios within the ranges mentioned above are used that genuine NCO-prepolymers containing only very small quantities of unreacted starting polyisocyanate are formed almost exclusively in the process of the present invention. The products obtained by the process of the invention have an NCO-content of from 5 to 45 wt % depending upon the starting polyisocyanate and hydroxyl-group-containing reactants used and also upon the quantitative ratio in which the reactants are used. Where the preferred polyisocyanates or polyisocyanate mixtures of the diphenylmethane series are used, urethane-modified polyisocyanate preparations having an NCO-content of from 5 to 30 wt % are generally formed. Therefore, in the practical application of the process of the invention, the type of reactants used and the quantitative ratios in which they are used are preferably selected in such a way that the end products have NCO-contents within the range just mentioned.

The products obtained by the process of the present invention generally have a lower melting point than the corresponding starting polyisocyanate. They may be used with advantage, optionally in admixture with other polyisocyanates known in the art of polyurethane chemistry, for the production of polyurethane plastics. The products obtained by the process of the invention may be used with particular advantage as polyisocyanate components in the production of molded plastics by the RIM (reaction injection molding) process, i.e. both for the production of rigid, semirigid and flexible integral foams and also for the production of the corresponding solid (i.e. at best microcellular) moldings having a gross density of from 0.8 to 1.4 and preferably from 0.9 to 1.2 g/cc.

In this application, the products obtained by the process of the invention may be used either instead of or in admixture with the polyisocyanates normally used for this purpose. This means in particular that the isocyanate-reactive materials containing at least two isocyanate-reactive groups, other reactants and auxiliaries useful in the production of polyurethanes from the products of the process of the invention as well as process parameters correspond to those known and used in the prior art. Examples of such reactants and auxiliaries and process parameters are given in German Offenlegungsschriften Nos. 1,953,637, 2,121,670, 2,356,692, 2,363,452, 2,404,310, 2,427,273, 2,431,968, 2,307,589, 2,319,648 and 3,012,126, U.S. Pat. Nos. 4,065,410 and 4,218,543 and published European Patent Applications (Publication Nos.) 17,928, 44,481 and 81,701.

The products obtained by the process of the invention may of course also be used as polyisocyanate components in the production of other polyurethane plastics, for example in the production of free-foamed rigid, semirigid or flexible polyurethane foams, either instead of or in admixture with the polyisocyanates hitherto used for that purpose. High-quality polyisocyanurate plastics may also be produced by known processes using the products obtained by the process of the invention as the polyisocyanate component.

The polyurethane plastics obtained using the products of the process of the present invention are distinguished by excellent mechanical properties. Basically, they may be used for the same applications as state-of-the-art polyurethane plastics.

Having thus described the invention, the following examples are given by way of illustration. In these examples, all of the percentages quoted represent percentages by weight and all the parts quoted are parts by weight.

EXAMPLES

The following compounds were used to produce urethane-modified polyisocyanate preparations (NCO-semi-prepolymers):

Polyisocyanate I: a mixture of 83% of 4,4'-diisocyanatodiphenylmethane, 7% of 2,4'-diisocyanatodiphenylmethane and 10% of higher polyisocyanates of the diphenylmethane series (NCO-content 32.2%)

Polyisocyanate II: 4,4'-diisocyanatodiphenylmethane

Polyisocyanate III: 2,4'-diisocyanatodiphenylmethane and 4,4'-diisocyanatodiphenylmethane in a ratio by weight of 60:40

Diol I: N,N'-bis-(hydroxyethyl)-5,5-dimethyl hydantoin (OH No.: 519)

Diol II: methylene-bis-[3-(2'-hydroxyethyl)-5,5-dimethylhydantoin-1-yl](OH No.: 315)

EXAMPLE 1

1000 parts of polyisocyanate I were thoroughly mixed by stirring at 20° C. with 149 parts of diol I and the resulting mixture subsequently heated for 3 hours to 80° C. The quantities in which the reactants were used corresponded to an NCO:OH equivalent ratio of 5.56:1. The urethane-modified polyisocyanate preparation obtained after cooling to room temperature had an NCO-content of 23.5% and a viscosity of 5500 mPa.s (25° C.).

EXAMPLE 2 (use)

95 parts of a polyether triol (OH No. 27) produced by the propoxylation of trimethylol propane and subsequent ethoxylation of the propoxylation product (ratio by weight of PO to EO=78:22), 23.5 parts of ethylene glycol, 30 parts of dichloromethane, 0.15 part of the tin-based polyurethane catalyst (designated as UL 1 and produced by Witco) and 0.1 part of triethylene diamine were combined to form a polyol component.

235 parts of the polyol component thus produced were thoroughly mixed at 25° C. with 267 parts of the polyisocyanate preparation of Example 1 using a standard commercially available piston metering unit equipped with a positively controlled mixing head (a Rimdomat® piston metering unit equipped with a plunger-cleaned throttle slide mixing head MQ of the type manufactured by the Hennecke Company of St. Augustin) and the resulting mixture was introduced into a steel mold internally measuring 20×20×1 cm which had been heated to 60° C. The inner walls of the mold had been sprayed with a commercially available wax-based mold-release agent (a solution in dichloromethane of "Phonixwachs", a product of the Acmos Co.). The residence time in the mold was 2 minutes. The mechanical data of the resultant molding are shown in Table 1 below.

EXAMPLE 3 (comparison)

280 parts of the polyol component used in Example 2 were processed as described in Example 2 with 278 parts of a standard commercially available polyisocyanate mixture (NCO-content 24.5%) obtained by reacting polyisocyanate I with dipropylene glycol to form a molding. The mechanical properties of this molding are also shown in Table 1.

TABLE 1

|  | Example 2 | Example 3 |
|---|---|---|
| Unit weight (kg/m$^3$) (DIN 53 420) | 694 | 701 |
| Shore-D hardness (DIN 53 505) | 60 | 69 |
| E-modulus in flexure (RT) (MPa) (ASTM-D 790) | 281 | 365 |
| Tensile strength (MPa) (DIN 53 504) | 9.1 | 8.3 |
| Breaking elongation (%) (DIN 53 504) | 71.3 | 76.0 |
| Sag value (30 mins./160° C.) (mm) | 12.8 | 11.3 |
| Impact strength at RT (kJ/m$^2$) (DIN 53 453) | unbroken | unbroken |

EXAMPLE 4

670 parts of polyisocyanate I were combined with stirring at room temperature with 100 parts of diol I, followed by heating for 3 hours to 80° C. 192 g of a polyether triol (OH No. 28) obtained by the propoxylation of trimethylol propane and subsequent ethoxylation of the propoxylation product (ratio by weight of PO to EO=83:17) were then added and the resulting reaction mixture was stirred for another 3 hours at 80° C. The equivalent ratio of isocyanate groups to hydroxyl groups of both starting polyols amounted to 5.51:1. The resulting urethane-modified polyisocyanate preparation had a viscosity of 14,000 mPas at 32° C. and an NCO-content of 17.8%.

EXAMPLE 5

670 parts of polyisocyanate I were stirred with 292 parts of a mixture of 100 parts of diol I and 192 parts of the polyether triol used in Example 4, followed by stirring for 3 hours at 80° C. The equivalent ratio between isocyanate groups and hydroxyl groups amounted to 5.51:1. The urethane-modified polyisocyanate preparation obtained had a viscosity of 6000 mPas at 32° C. and an NCO-content of 18%.

EXAMPLE 6 (use)

161 parts of the polyether triol of Example 2, 40 parts of ethylene glycol, 17 parts of dichloromethane, 0.2 part of the tin catalyst used in Example 2 and 0.17 part of triethylene diamine were combined to form a polyol component which was then processed as in Example 2 with 309 parts of the urethane-modified polyisocyanate preparation of Example 4 to form a molding.

The mechanical data of the resultant molding are shown in Table 2.

EXAMPLE 7 (use)

The procedure was as in Example 6, except that 309 parts of the polyisocyanate preparation of Example 5 were used instead of the polyisocyanate preparation of Example 4.

The data of the resultant molding are shown in Table 2.

TABLE 2

| | Example 6 | Example 7 |
|---|---|---|
| Unit weight (kg/m$^3$) (DIN 53 420) | 980 | 1018 |
| Shore-D hardness (DIN 53 505) | 62 | 62 |
| E-modulus in flexure (RT) (ASTM-D 790) | 164 | 277 |
| E-modulus in tension (RT, MPa) (DIN 53 455) | 143 | 198 |
| Breaking elongation (%) (DIN 53 504) | 180 | 112 |
| Tensile strength (MPa) (DIN 53 504) | 8.4 | 14.0 |
| Sag value (160° C./30 mins.) (mm) | 14.2 | 13.7 |

EXAMPLE 8 (use)

770 parts of the polyether triol used in Example 4 (OH No. 28), 23 parts of a mixture of 65% of 1-methyl-2,4-diamino-3,5-diethyl benzene and 35% of 1-methyl-2,6-diamino-3,5-diethyl benzene, 0.2 part of the tin catalyst used in Example 2 and 0.6 part of a 33% solution of triethylene diamine in dipropylene glycol were combined to form a polyol component. As in Example 2, quantities of 100 parts of this polyol component were processed with 57.4 parts of the urethane-modified polyisocyanate preparation of Example 1 (test A) and for comparison, with 55 parts of the standard commercially available polyisocyanate of Example 3 (test B) to form moldings.

The mechanical properties of the resultant moldings are shown in Table 3.

TABLE 3

| | Example 8A | Example 8B |
|---|---|---|
| Unit weight (kg/m$^3$) (DIN 53 420) | 1093 | 1100 |
| Shore-D hardness (DIN 53 505) | 58 | 58 |
| Tensile strength (RT) (MPa) (DIN 53 504) | 25.6 | 26 |
| Breaking elongation (%) (DIN 53 504) | 257 | 256 |
| Tear propagation resistance (KN/m) (DIN 53 515) | 53.6 | 65 |
| Modulus in tension, 50% (MPa) (DIN 53 504) | 13.5 | |
| E-modulus in flexure (MPa) (ASTM-D 790) | | |
| RT | 425 | 350 |
| 120° C. | 166 | 200 |
| Sag value (30 mins./160° C.) (mm) | 6 | 4 |

EXAMPLE 9

1250 g of polyisocyanate II and 210 g of diol I were combined at 50° C. and then heated with stirring first for 30 minutes at 50° C. and then for 3 hours at 80° C. The NCO:OH-equivalent ratio was 5.15:1. The product which was solid at 20° C. had an NCO-content of 23.04%.

EXAMPLE 10

1278 g of polyisocyanate II were heated to 80° C. and then added with stirring to 220 g of diol I, the temperature being kept at that level by cooling. The mixture was stirred at that temperature for a total of 3 hours. The NCO-content of the semi-prepolymer, which crystallized slowly, but which could be readily liquefied in the same way as the product of Example 9 by heating to 50° C., had an NCO-content of 22.25% for an NCO:OH equivalent ratio of 5.04:1.

EXAMPLE 11 (use)

225 g of a mixture of the polyether triol of Example 2 and ethylene glycol in a ratio by weight of 95:23.5, 10 g of dichloromethane, and 0.08 g of the tin catalyst used in Example 2 were combined to form a polyol component and processed as described in Example 2 with 274 parts of the urethane-modified polyisocyanate preparation of Example 9 to form a molding.

The mechanical data of the resultant molding are shown in Table 4.

EXAMPLE 12 (use)

222 g of a mixture of the polyether triol of Example 2 and ethylene glycol in a ratio by weight of 95:23.5, 10 g of dichloromethane and 0.08 g of the tin catalyst used in Example 2 were combined to form a polyol component which was then processed as described in Example 2 with 282 g of the urethane-modified polyisocyanate preparation of Example 10 heated to 60° C. to form a molding.

The mechanical data of this molding are shown in Table 4 below.

TABLE 4

| | Example 11 | Example 12 |
|---|---|---|
| Unit weight (kg/m$^3$) (DIN 53 420) | 1010 | 1035 |
| Shore-D hardness (DIN 53 505) | 65 | 68 |
| E-modulus in flexure (23° C., MPa) (ASTM-D 790) | 353 | 402 |
| Max. modulus in tension (MPa) (DIN 53 455) | 9.8 | 12.2 |
| Breaking elongation (%) (DIN 53 455) | 27.9 | 33.8 |
| Sag value (160° C./30 mins.) | 16.2 | 9.8 |

EXAMPLE 13

517 g of polyisocyanate I were heated to 80° C., followed by the addition with stirring at that temperature of 100 g of diol II. The mixture was then kept at that temperature for 2 hours, followed by heating for 2 hours to 120° C. The liquid product had an isocyanate content of 23.05%. The NCO:OH-equivalent ratio used amounted to 7.04:1.

EXAMPLE 14

1000 g of polyisocyanate III were combined with 150 g of diol I at room temperature, followed by stirring for 4 hours at 80° C. The NCO:OH equivalent ratio amounted to 5.77:1. The liquid product had an NCO-content of 24.3% and a viscosity of 4900 mPa.s (25° C.).

EXAMPLE 15

1000 g of polyisocyanate III were combined with 205 g of diol II at room temperature, followed by stirring for 4 hours at 80° C. The NCO:OH-equivalent ratio amounted to 6.93:1. The liquid product had an NCO-content of 24% and a viscosity of 7300 mPa.s (25° C.).

EXAMPLE 16

1000 g of polyisocyanate I were combined at room temperature with a mixture of 100 g of diol I and 40 g of dipropylene glycol and the resultant mixture kept at 80° C. for 3 hours. The NCO:OH:OH ratio amounted to 8.33:1:0.65 and the NCO-content of the liquid product was 23.75%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of urethane-modified polyisocyanate compositions having an isocyanate content of from 5 to 45 wt % comprising reacting
   (a) an organic polyisocyanate or a mixture of organic polyisocyanates having an isocyanate content of from 30 to 50 wt % with
   (b) at least one hydantoin having an OH number of from 56 to 596 containing two alcoholic hydroxyl groups which hydantoin has hydroxyalkyl substituents on its nitrogen atoms
in quantities such that an NCO:OH equivalent ratio of 2:1 to 50:1 is achieved.

2. The process of claim 1 in which the hydantoin (b) contains ether bridges.

3. The process of claim 1 in which component (b) further includes up to 50 hydroxyl equivalent percent of an organic polyhydroxyl compound which is not a hydantoin.

4. The process of claim 1 in which the hydantoin used as component (b) corresponds to the formula

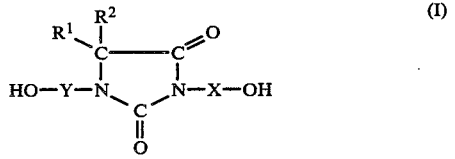

in which
R¹ and R² which may be the same or different, each represents an alkyl radical or, together with the carbon atom of the heterocyclic ring form a cycloaliphatic ring,
X represents a straight-chain or branched alkylene radical containing from 2 to 6 carbon atoms or a radical of a polyalkylene ether chain from which the terminal oxygen atom has been removed and
Y represents a radical within the definition of "X" or a radical corresponding to the formula

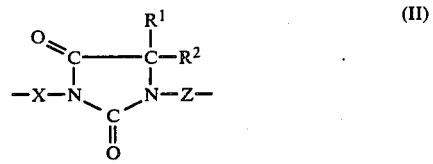

in which R¹, R² and X are as defined above and Z represents a difunctional hydrocarbon carbon radical.

5. The process of claim 4 in which the radicals R¹, R², X and Y in formula (I) are as follows:
R¹ and R² which may be the same or different, each represents an alkyl radical having from 1 to 4 carbon atoms or, together with the carbon atom of the heterocyclic ring form a cycloaliphatic hydrocarbon radical containing 5 or 6 carbon atoms and
X and Y which may be the same or different, each represents ethylene or a 1,2-propylene radical.

6. The process of claim 5 in which the organic polyisocyanate (a) is selected from the group consisting of:
   (1) 4,4'-diisocyanatodiphenylmethane,
   (2) mixtures of 4,4'-diisocyanatodiphenylmethane and 2,4'-diisocyanatodiphenylmethane,
   (3) mixtures of 4,4'-diisocyanatodiphenylmethane, 2,4'-diisocyanatodiphenylmethane and 2,2'-diisocyanatodiphenylmethane,
   (4) crude phosgenation products of aniline/formaldehyde condensates, and
   (5) mixtures of any of the above-enumerated diisocyanates with up to 50 equivalent percent of the total isocyanate mixture constituting an aromatic polyisocyanate different from the enumerated diisocyanates.

7. The process of claim 1 in which the organic polyisocyanate (a) is selected from the group consisting of:
   (1) 4,4'-diisocyanatodiphenylmethane,
   (2) mixtures of 4,4'-diisocyanatodiphenylmethane and 2,4'-diisocyanatodiphenylmethane,
   (3) mixtures of 4,4'-diisocyanatodiphenylmethane, 2,4'-diisocyanatodiphenylmethane and 2,2'-diisocyanatodiphenylmethane,
   (4) crude phosgenation products of aniline/formaldehyde condensates, and
   (5) mixtures of any of the above-enumerated diisocyanates with up to 50 equivalent percent of the total isocyanate mixture constituting an aromatic polyisocyanate different from the above-listed diisocyanates (1) through (4).

8. A process for the production of polyisocyanate addition products comprising reacting the urethane-modified polyisocyanate composition of claim 1 with a compound having at least two isocyanate-reactive groups.

* * * * *